United States Patent [19]
Tlok

[11] Patent Number: 5,910,248
[45] Date of Patent: Jun. 8, 1999

[54] WATER FILTRATION

[76] Inventor: Bernd Tlok, Haulandsweg 104, 21220 Seevetal, Germany

[21] Appl. No.: 08/793,609

[22] PCT Filed: Sep. 6, 1995

[86] PCT No.: PCT/EP95/03500

§ 371 Date: Mar. 7, 1997

§ 102(e) Date: Mar. 7, 1997

[87] PCT Pub. No.: WO96/07618

PCT Pub. Date: Mar. 14, 1996

[30] Foreign Application Priority Data

Sep. 10, 1994 [DE] Germany ............... 44 33 388

[51] Int. Cl.[6] ....................................... C02F 3/04
[52] U.S. Cl. ................ 210/608; 210/617; 210/631; 210/747; 210/150; 210/169; 210/170; 119/260; 119/268
[58] Field of Search .................... 119/259, 260, 119/261, 268; 210/608, 617, 703, 776, 169, 150, 151, 221.2, 416.2, 631, 704, 170, 747

[56] References Cited

U.S. PATENT DOCUMENTS

| | | | |
|---|---|---|---|
| 2,308,866 | 1/1943 | Dekema ........................................ | 210/7 |
| 3,616,919 | 11/1971 | Feddern et al. ........................ | 210/169 |
| 3,965,007 | 6/1976 | Conn et al. .............................. | 210/169 |
| 3,994,811 | 11/1976 | Cohen et al. ........................... | 210/169 |
| 4,036,228 | 7/1977 | Theeuwes ................................ | 128/260 |
| 4,749,493 | 6/1988 | Hicks ....................................... | 210/617 |
| 4,988,436 | 1/1991 | Cole ......................................... | 210/169 |
| 5,078,867 | 1/1992 | Danner ..................................... | 210/169 |
| 5,084,164 | 1/1992 | Del Rosario ............................. | 210/94 |
| 5,628,905 | 5/1997 | Montalbano ............................. | 210/615 |
| 5,665,227 | 9/1997 | Watt ......................................... | 210/169 |

FOREIGN PATENT DOCUMENTS 241 406  12/1986  Germany .

*Primary Examiner*—Peter A. Hruskoci
*Attorney, Agent, or Firm*—Henderson & Sturm

[57] ABSTRACT

A method for purifying water comprising at least one member selected from the group consisting of organic and inorganic particles, involving supplying water to a collection surface forming above an outlet of a filtration apparatus including filler material in an amount sufficient to cause the formation of bubbles in a trickle stream flowing through the filtration apparatus and forming foam on the collection surface by utilizing the bubbles, binding a major part of the at least one member selected from the group consisting of organic and inorganic particles in the foam, and skimming the foam off the collection surface into an area above the collection surface under pressure compensation. A filter apparatus for purification of water, including filler material, at least one feeding device for water which is to be cleaned and which contains particles selected from the group of particles consisting of organic particles and inorganic particles, at least one outlet for removing purified water, an area forming a collection surface located above the outlet, and a discharge for drawing off foam above the area forming a collection surface.

13 Claims, 1 Drawing Sheet

WATER FILTRATION

CROSS-REFERENCE TO RELATED APPLICATIONS

This application is a 371 of PCT/EP95/03500, filed Sep. 6, 1995.

STATEMENT REGARDING FEDERALLY SPONSORED RESEARCH OR DEVELOPMENT

Not Applicable.

BACKGROUND OF THE INVENTION

1. Field of the Invention

The invention relates to a method for purifying water, the water which is to be cleaned and which contains organic and/or inorganic particles being conveyed into a filtration plant containing filler material, being purified as a result of forming a trickling stream and subsequently being removed through at least one outlet, and to an apparatus for carrying out the method.

2. Description of the Prior Art

The above-mentioned method and the device working according to this method are well known in practice in connection with so-called trickle filter plants. In such plants, the water to be purified/filtered is guided over an arrangement of trickle elements. Bacteria, which filter protein and other organic compounds out of the water and decompose these by means of specific metabolic processes, settle on the trickle elements. On this way, the water passes over the trickle elements very slowly so that a bacterial purification of the water may take place in to an adequate extent. In other words, one can talk rather of trickling than of flowing, let alone of pouring. A disadvantage of this method is that, as the water can be sent through the filtration arrangement only very slowly, a correspondingly large dimensioning of the arrangement is necessary or an increased water throughput must be carried out with a smaller dimensioning of the plant in a closed water circuit, in order to obtain an adequate purification result. In addition, the purification of the water is based only on the bacterial decomposition of organic substances. Apart from the gases which are set free inorganic and also organic substances remain in the water, which, in closed water circuits, possibly leads to an accumulation of toxicants; hence, a frequent exchange of the water in fresh water aquaristic is normally unavoidable. Furthermore it is disadvantageous that due to the required slow trickling velocities, the evaporation of the water is very high, possibly resulting in a concentration of salt in the water. A trickle filter plant also requires an initialization period of several weeks before the device can be used fully to allow the bacteria to settle or the trickle elements. Finally, very high amounts of oxygen are required by the bacteria for the bacterial decomposition of organic substances, the oxygen being extracted from the water itself. Additional energy is required for the supply of oxygen. Finally, the discharged water can be polluted with the excrements and metabolic products of the bacteria.

A further problem of fresh water plants such as e.g. nutrition rich ponds, is that the formation of algae caused by insolation leads to considerable fluctuations in the pH level and impedes vision.

DD 241 406 discloses a trickle film reactor without a valve tray for the continuous elimination from water which is essentially free of suspended matter of substances dissolved in the water, the reactor being filled with fine-grain filler material having a density of essentially less than 1 g/cm$^3$ and having a banking-up height control device. A reactor of this kind is likewise limited in its flowing velocity, as the purification of the water occurs bacterially. Furthermore, the reactor is not suitable for water containing larger amounts of suspended matter, as this might clog the small filler material particles causing blockage of the reactor.

Furthermore, a method for the purification of salt water from contamination by proteins and other organic compounds has been known since the beginning of the 1070s, the method exploiting the ability of protein and the other organic substances to form foam. The water (sea water) containing high amounts of sodium chloride is set in motion by supplying air from below, causing the proteins to be pulled with the upwardly bubbling air and resulting in a strong foam formation on the surface. The foam which then accumulates on the surface can be skimmed off, the nitrogen containing organic compounds being simultaneously removed. The water inlet of such a plant is located below the surface of the water, so that the salt water flowing in does not come into contact with the formed foam layer. Plants of this kind are suited only for salt water aquariums, in which the filtration occurs via a filtration column, so that the water having a high sodium chloride content is continuously exchanged through inlet and outlet. This method cannot be applied to fresh water as fresh water has a higher interfacial surface tension and a lower density than water which contains sodium chloride.

A further disadvantage of this method is that the air supply also occurs from below, namely by blowing into the water, which requires energy to be expended.

Moreover, U.S. Pat. No. 4,988,436 discloses a filtration system for an aquarium having two purification steps, viz. one biological filtration step via a conventional trickle filter and one skimmer step. The water is initially guided over a trickle filter, where it is purified by bacteria. Afterwards the water is fed to a chamber in which skimming takes place by means of air blown into the water from below, i.e. against the direction of flow of the water. A foam layer, in which the impurities are deposited, forms on the surface of the water in the chamber.

A disadvantage of this method is that here,.too, the flow velocity of the water and consequently the water throughput of the arrangement depend on the purification via the trickle filter. For an effective biological purification, the water must be sent over the trickle filter very slowly. In addition, energy is required for blowing in the air in the second purification step, because the air is blown against the downwardly flowing water.

BRIEF SUMMARY OF THE INVENTION

Two further filtration systems, also for aquariums, are disclosed in U.S. Pat. No. 5,078,867 and U.S. Pat. No. 5,084,164. Both systems comprise two purification steps, one biological and one skimmer step. As in the above-mentioned U.S. Pat. No. 4,988,436, in U.S. Pat. No. 5,084, 164 air must be blown in from below for skimming, i.e. energy is required for supplying the air. In this system, also, the formation of the foam layer takes place on the water surface. In U.S. Pat. No. 5,087,867 air is fed through a rotating wheel, which turns out of and back into the water. For the rotation of the wheel additional energy is required which must be supplied to the system. Both arrangements are technically and structurally costly, as 15 they require inter alia an extensive chamber and tube system for feeding and rerouting the water to be purified. Furthermore, additional introduction of energy for aeration of the water is required.

In contrast thereto, it is the object of the present invention to provide a method and a device for the purification/filtration of water, primarily of fresh water, with which it is possible to achieve a high throughput of water by ensuring an optimal purification or filtration effect, whereby the device should have a markedly smaller size, and should therefore give rise to lower production, operating and maintenance costs.

This object is achieved with the method of the type described above in that the water is fed to a collection surface being formed above the outlet and the water is supplied in an amount sufficient to cause the formation of bubbles in the trickle stream while flowing through the reactor and also the formation of foam on the collection surface by utilizing these bubbles, all the while by binding a major part of the organic and inorganic constituents and by using their at least predominant ability to be skimmed off, and in that the foam forming here is drawn off into an area above the collection surface by means of pressure compensation. Since the water is sent over the filter with a very high flow velocity, the water is "battered" by the filler elements, i.e. the water surface area is enlarged and the water is increasingly mixed with air; air bubbles form. Hydrophobic, i.e. water repellent, particles present in the water preferably settle on the water surface, i.e. on the air bubbles. The particles bond with one another to form a relatively stable so-called crest film or skin. The air bubbles surrounded by the crest film are born downwardly with the water until they reach the water surface forming the collection surface. The bubbles stabilised by the crest film settle there and form a foam layer. Also bubbles which—when the collection basin is adequately filled—are dragged under the water surface, rise again as a result of the lifting force and settle on the collection surface as well. Such white film bubbles can attain a diameter of up to 3 cm and can be stable in air for several hours.

The foam layer formed in this way functions as a very effective filter which, in addition to inorganic and organic impurities, takes up and removes organisms of sizes from the smallest of bacteria to insects such as flies, for example, from the water. In contrast to a trickle filter, the impurities are withdrawn for good from the water by removing the foam and they cannot return to the circuit. As the air is entrained by the water, no additional energy is necessary for blowing in the air.

In this way, while satisfying the object of the invention, compounds which can be skimmed off such as nitrogen compounds (proteins, cellulose), the smallest of algae, non-wettable particles such as e.g. skins of plankton crabs as well as germs and parasites of fish present in the water can be removed from the water in the shortest time. Additionally, when using the method according the present invention for purification of fresh water ponds with fish, the flowering of algae is reduced even with high insolation, because the purification method according to the invention works extremely effectively and enables a very high water flow rate. The foam layer works as a filter, which filters particles out of the water as it flows by. Furthermore, this leads to a considerably smaller bacteria population and to a decrease in the corresponding pollution and oxygen use in the water. In addition, a filtration plant working according to the present invention is ready for use immediately after formation of the foam layer, which forms within a very short period. Furthermore, the foam layer being generated reduces the sinking velocity of the water passing through the layer, which increases the foam formation. Moreover, the skimmed-off foam which accumulates during the purification can be collected and used as fertilizer.

Advantageously, the water is sprinkled through a perforated plate, for example, before reaching the filler material so that the incoming water is dispersed uniformly over the trickle or filler elements, by which means the thickness of the layer of filler elements can be reduced.

In another advantageous embodiment of the invention, air is additionally fed to the water while the latter flows through the filter plant. This promotes the formation of air bubbles. A foaming agent can also be added to the water, which likewise increases the bubble and foam formation.

The ratio of water to air depends on the type of filler elements in the filter. A very good skimming occurs when full bodies with closed surfaces such as the clay granulate used for hydro cultures are used as filler elements. The water:air ratio then about 1:1.

Between the single granulate grains air chambers form, past which the water to be purified flows. As the water flows by, some of the air chambers are pulled along with it resulting in further bubbles being formed which settle in the foam layer.

In another preferred embodiment, the method comprises the purification of the water by bacterial decomposition and skimming in one step. Thus there occurs both a bacterial purification by means of the bacteria on the filler elements and a purifation by means of the foam layer. In order for the bacteria population to be formed an initialization period is necessary. When a filter arrangement according to the present invention is put into operation, during the first approximately 10 days, a purification will take place solely by means of the foam layer. Only afterwards will an adequate bacteria population have formed which takes over part of the purification of the water.

The flow velocity does however have an upper limit, because the generated foam layer must not be destroyed by the fall energy of the water droplets. The magnitude of the flow velocity to be selected in the individual case depends upon the dimensions of the filter plant as well as upon the type of filler elements used. With an appropriate set-up the generated foam layer remains stable at a thickness of several centimeters which can exceed 20 cm. The adjustment of the above-mentioned parameters has to be performed such that the falling water droplets and/or streams do not to destroy the generated foam layer as a result of their falling energy.

The stated object is attained by means of a filter arrangement for the purification of water which is filled with filler material and comprises at least one feeding device for the water which is to be purified and which contains organic and/or inorganic constituents, and at least one outlet for removing the purified water, the filter arrangement having an area above the outlet for forming a collection surface and a discharge provided above said outlet for drawing off the foam.

Apart from discharging the impurities, the discharge for drawing off the foam ensures pressure compensation in the filter. Because of the dynamic pressure of the water the foam layer might otherwise be destroyed, if pressure compensation is not provided in another way.

Advantageously, the filter arrangement can be constructed like a tower, i.e. its height should be greater than its width/length. In this way, a filter arrangement according to the invention can, for example, have a height of 2 m and a base area of 0,16 m². With such a filter arrangement a throughput of the water to be purified of approximately 5,000 l per hour is possible. These values are considerably higher than those of conventional filter arrangements of equivalent size which only have a trickle function.

In order to raise the oxygen content of the water, air inlets and outlets can additionally be provided in the middle region of the filter arrangement. This increases the purification power.

In order to increase the oxygen supply to the water to be purified, the filler elements can be provided as trickle elements with enlarged surface areas. This has also the advantage that bacteria can form on these trickle elements, which additionally work as a filter for organic compounds in the known manner. The bacteria present on the mechanical elements contribute to the decomposition of unwanted organic compounds in addition to the foam layer.

Advantageously, the energy of the downwardly flowing water can be reduced before reaching the foam layer, so preventing destruction of the foam layer.

To this end, the falling velocity of the downwardly flowing water must be retarded before the foam layer is reached. This is achieved by adjusting the falling velocity of the water to be purified emerging from the inlet by means of mechanical elements before it reaches the foam layer. The mechanical elements themselves must, of course, be permeable to water and/or foam.

Such mechanical elements, which reduce the falling velocity of the water before reaching the foam layer, can advantageously be provided as sieve-like perforated plates or grids, as granulate-like bodies such as e.g. pebbles, clay granulates or as the known trickle elements. It is also easily possible to provide the filler elements in the form of broken balls, plastic tubes, brushes, sieves or hair-curler-like elements. The essential features are the ability to reduce the falling velocity of the water and to allow the water to pass through.

In order to further reduce turbulence, mechanical elements such as e.g. trickle elements, perforated plates, sieves or the like can be arranged in and/or below the foam layer.

Advantageously, the inlet arranged in the upper region of the filter arrangement can be formed like a sieve and spray the water into the arrangement in the manner of a shower, thereby enriching the water with oxygen. By means of such a spraying of the water to be purified, a higher filter power can be attained. The sieve-like structure can be achieved by means of grid sieves, perforated areas with a plurality of water outlets or with similar structures.

The arrangement can be employed in the open, e.g. in a waterfall, very well. In such an application, the arrangement works without additional energy, as the arrangement is inserted directly in the waterfall. In this way, it is possible to purify rivers with comparatively little effort. The foam is continuously extracted through a discharge and collected in a receptacle. The initially rather voluminous foam collapses with time, and the residue can be removed at intervals.

BRIEF DESCRIPTION OF THE DRAWING

Further advantages and embodiments of the present invention are disclosed in the following description of the example shown in the schematic drawing.

The FIGURE shows a longitudinal cross-section through a device according to the invention in form of a filter arrangement for purifying a fresh water pond containing fish.

DETAILED DESCRIPTION OF THE INVENTION

Figure 1:
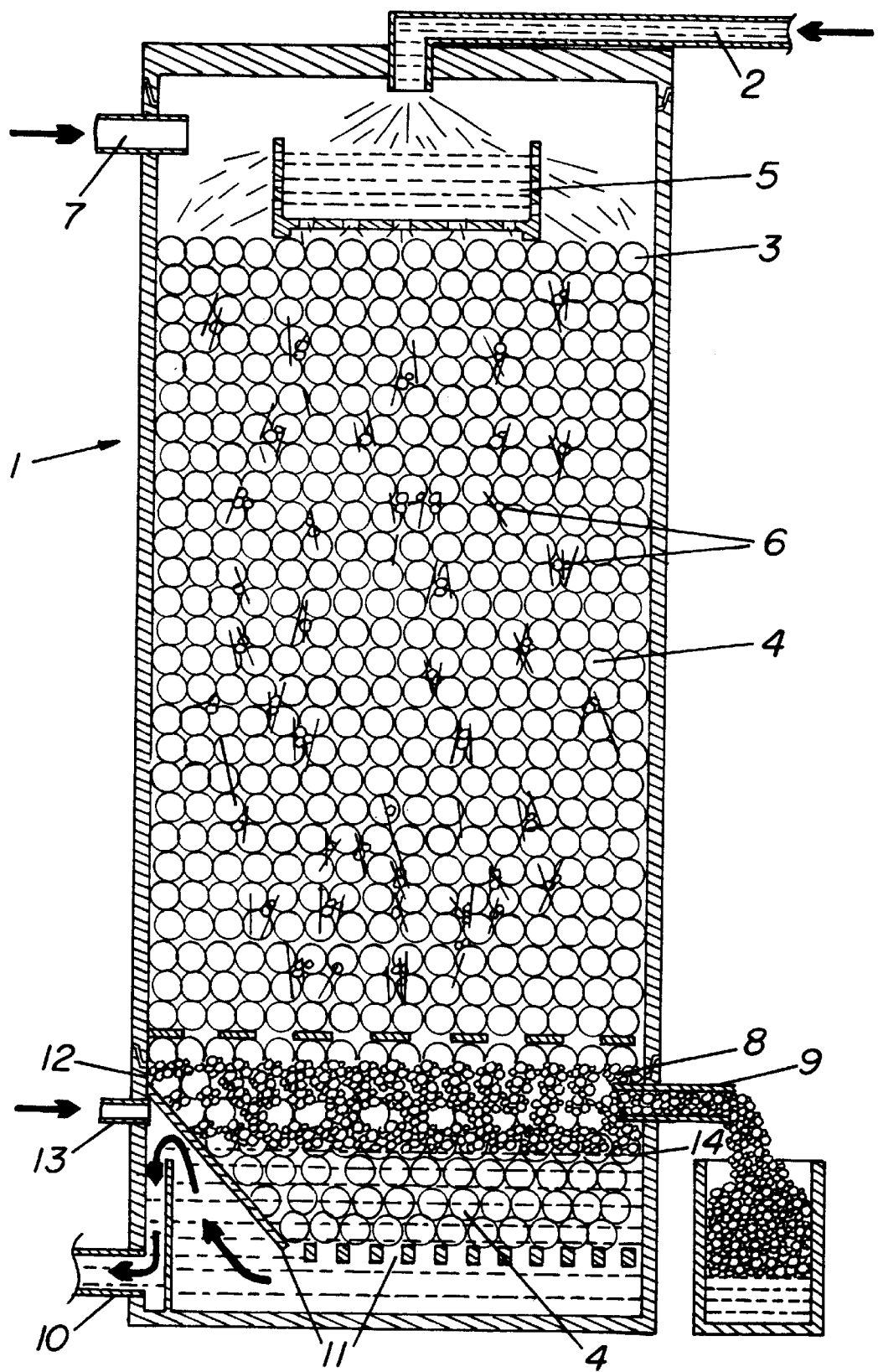

A device working according to the method of the present invention is formed as a tower-shaped filter arrangement 1. Water to be purified is sprayed through an inlet 2 onto trickle elements 4 formed as mechanical elements 3 via a sieve-like tub which distributes the flow of water uniformly, the trickle elements lying in layers on a grate-like element, and possibly being piled up on top of one another as far as a collecting basin 12. The water then flows downwardly over the spherical/waterfall-like trickle elements, becoming mixed with air. To prevent an air deficit, additional air can be supplied/blown in at 7.

The air:water ratio depends on the type of filler elements. When using Bioballs or Dupler balls the ratio advantageously amounts to 10:1 to 15:1. Clay granulate allows a particularly good skimming when the air:water ratio amounts to about 1:1.

Because of the layed trickle elements 4 the flow or fall velocity of the water stream or droplets is reduced and the surface area of the water is enlarged. Air bubbles 6 develop. Hydrophobic, i.e. water repellent, particles and the smallest of floating particles present in the water preferably settle on the water surface, hence also on the air bubbles 6. The particles join with one another forming a relatively stable so-called white film. The air bubbles surrounded by the white film are dragged downwards with the water until they reach the surface, of the water contained in the collecting basin 12 of the filter arrangement 12. The bubbles stabilized by the white film settle there and form a foam layer 8. Bubbles which are pulled under the water surface rise again due to the lifting force and settle on the collection surface 14 as well. As a consequence of the reduced falling velocity of the downwardly flowing, specifically selected water quantity, the foam layer 8 is not impaired and excessive turbulence is prevented in the foam area. Additionally, elements such as e.g. trickle elements, broken plates, or the like can be arranged in the foam layer 8 itself. Organic impurities will also be partially decomposed by the bacteria layer on the surface of the trickle elements. At the lower end of the trickle element layer 4 the water flows through the grate-like element into the generated foam layer 8, in which the water falling velocity is further reduced and the foam formation is further enhanced. As the water passes through the foam 8, the impurities present in the water are absorbed by the foam.

A discharge 9, from which the foam 8 is continuously discharged, i.e. extracted, is located in the filter arrangement 1 in the region of the foam layer 8. The purified water contained in the collecting basin 12 is guided back into the circuit of the fresh water pond—filter arrangement through an outlet 10. An almost uniform water level is achieved by means of a separation element 11. Of course, the water is withdrawn only in an amount which is suitable for the water level which is desired and compatible with the size of the arrangement.

Finally, an air inlet 13 is provided in the filter arrangement according to the invention in the region of the collecting basin, and provides for pressure compensation in the outflowing water.

The wall of the filter arrangement 1 can be made of hard styropor and can comprise mutually separable elements to facilitate assembly and disassembly.

What is claimed is:

1. A method for purifying water comprising at least one member selected from the group consisting of organic and inorganic particles, said method comprising supplying water to a collection surface forming above an outlet of a filtration apparatus comprising filler material, said water being supplied in an amount sufficient to cause the formation of bubbles in a trickle stream flowing through said filtration apparatus and forming foam on said collection surface by utilizing said bubbles, binding a major part of said at least one member selected from the group consisting of organic and inorganic particles in said foam, skimming said foam off said collection surface into a discharge area above said collection surface under pressure compensation, and discharging purified water through said outlet.

2. A method according to claim 1, comprising sprinkling said water before reaching the filler material of said filter apparatus.

3. A method according to claim 1 comprising adding air to the water as the water flows through the filter apparatus.

4. A method according to claim 1, comprising adding a foaming agent to the water.

5. A method according to claim 1, wherein said filler material comprises full elements with closed surfaces and wherein said foam comprises a water:air ratio of about 1:1.

6. A method according to claim 1, wherein bacterial decomposition and skimming is accomplished in one step.

7. A filter apparatus for purification of water, said water being supplied in an amount sufficient to cause formation of bubbles in a trickle stream of said water, said filter apparatus comprising filler material, at least one feeding device for said water which is to be cleaned and which contains particles selected from the group consisting of organic particles and inorganic particles, at least one outlet for removing purified water, an area forming a collection surface located above said outlet, wherein a foam is formed from said bubbles, and a discharge for drawing off foam above said area forming a collection surface.

8. A filter apparatus according to claim 7, comprising sprinkling means for sprinkling water located in a direction of flow before the filter material.

9. A filter apparatus according to claim 7 wherein the filter apparatus is substantially tower-shaped, having a height larger than a diameter.

10. A filter apparatus according to claim 7, comprising air inlets and outlets for increasing skimming power.

11. A filter apparatus according to claim 7, wherein said filler material comprises trickle elements with enlarged surface areas.

12. A filter apparatus according to claim 7 comprising mechanical elements positioned in at least one location with respect to the foam layer selected from a group of locations in the foam layer and a group of locations below the foam layer to reduce turbulence.

13. A method of using a filter apparatus according to claim 7 in a waterfall, said method comprising exposing water in a waterfall to said filter apparatus to remove particles selected from the group consisting of organic particles and inorganic particles from said water.

* * * * *